(12) United States Patent
Lee et al.

(10) Patent No.: US 11,371,672 B2
(45) Date of Patent: Jun. 28, 2022

(54) LAMP DEVICE FOR VEHICLE

(71) Applicant: HYUNDAI MOBIS CO., LTD., Seoul (KR)

(72) Inventors: Seung Ha Lee, Yongin-si (KR); Sun Yeon Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/114,459

(22) Filed: Dec. 7, 2020

(65) Prior Publication Data

US 2021/0199262 A1 Jul. 1, 2021

(30) Foreign Application Priority Data

Dec. 26, 2019 (KR) .................. 10-2019-0175624

(51) Int. Cl.
*F21S 43/19* (2018.01)
*F21S 43/50* (2018.01)
*F21S 43/14* (2018.01)
*F21S 43/20* (2018.01)

(52) U.S. Cl.
CPC ............. *F21S 43/195* (2018.01); *F21S 43/14* (2018.01); *F21S 43/26* (2018.01); *F21S 43/50* (2018.01)

(58) Field of Classification Search
CPC .. F21S 43/14; F21S 43/26; F21S 43/50; F21S 43/195
See application file for complete search history.

(56) References Cited

U.S. PATENT DOCUMENTS

| | | | | |
|---|---|---|---|---|
| 7,791,458 | B2* | 9/2010 | Shimaoka ............... | B60Q 1/085 340/435 |
| 10,040,392 | B2* | 8/2018 | Salter ..................... | H05B 47/13 |
| 2005/0117364 | A1* | 6/2005 | Rennick ............... | B60Q 1/2665 362/540 |
| 2010/0017111 | A1* | 1/2010 | Stefani ................... | G01C 15/00 701/533 |
| 2012/0044090 | A1* | 2/2012 | Kahler ..................... | B60Q 1/50 340/905 |
| 2014/0321135 | A1* | 10/2014 | Chen ....................... | B60Q 1/12 362/487 |
| 2016/0257243 | A1* | 9/2016 | Son .......................... | B60Q 1/50 |
| 2017/0151904 | A1* | 6/2017 | Youn ....................... | B60Q 1/50 |

(Continued)

FOREIGN PATENT DOCUMENTS

KR 10-0181246 4/1999

*Primary Examiner* — Bryon T Gyllstrom
*Assistant Examiner* — Christopher E Dunay
(74) *Attorney, Agent, or Firm* — H.C. Park & Associates, PLC

(57) ABSTRACT

A lamp device mounted on either side of a bumper of a vehicle includes a lamp casing installed in the bumper; a guide lamp provided at an upper side inside the lamp casing and configured to project light in a predetermined pattern on a road surface to guide a traveling direction of the vehicle; and an illumination lamp provided at a lower side inside the lamp casing and configured to diffuse the light in a traveling direction of the vehicle to illuminate the traveling direction of the vehicle, in which the guide lamp includes a first light source provided at the upper side inside the lamp casing; and a first lens unit provided in front of the first light source and configured to project the light from the first light source in a predetermined pattern on the road surface in order to guide the traveling direction of the vehicle.

14 Claims, 8 Drawing Sheets

(56) References Cited

U.S. PATENT DOCUMENTS

| | | | | |
|---|---|---|---|---|
| 2017/0166111 | A1* | 6/2017 | Baccarin | F21S 43/26 |
| 2018/0118095 | A1* | 5/2018 | Kunii | B60Q 1/085 |
| 2019/0315269 | A1* | 10/2019 | Kishigami | B60Q 1/346 |
| 2019/0322209 | A1* | 10/2019 | Sugiyama | F21S 41/43 |
| 2020/0088379 | A1* | 3/2020 | Kurashige | G02B 5/1842 |
| 2020/0207258 | A1* | 7/2020 | Tezuka | B60Q 1/32 |

\* cited by examiner

LAMP DEVICE FOR VEHICLE

CROSS-REFERENCE TO RELATED APPLICATION

This application claims priority from and the benefit of Korean Patent Application No. 10-2019-0175624 filed on Dec. 26, 2019, which is hereby incorporated by reference for all purposes as if set forth herein.

BACKGROUND

Field

Exemplary embodiments relate to a lamp device for a vehicle, which adopts a lens for projecting light on a road surface in a traveling direction when a vehicle moves forward or rearward.

Discussion of the Background

In general, lamps for guiding a vehicle include turn signal guide lamps and reversing lamps. The turn signal guide lamp refers to a lamp configured to be operated when a driver manipulates a multifunctional switch while driving the vehicle. The turn signal guide lamp serves to notify drivers in other vehicles of changes in lanes or of a traveling direction of the vehicle at an intersection. The reversing lamp refers to a lamp that serves not only to illuminate a rear side of the vehicle, but also to notify drivers in other vehicles at lateral and rear sides of the intention of reversing when the drive manipulates a gear shift lever to a reverse position (R-position).

Meanwhile, the lamp includes a light source, and a reflector configured to reflect light emitted from the light source to project the light on a road surface positioned in a traveling direction of the vehicle.

However, since the lamp reflects the light emitted from the light source to project the light on the road surface, there are problems in that clarity of the light deteriorates and the lamp cannot be installed at a position spaced apart from a ground surface at a predetermined height or more.

The above information disclosed in this Background section is only for enhancement of understanding of the background of the invention and, therefore, it may contain information that does not constitute prior art.

SUMMARY

Exemplary embodiments of the present invention provide a lamp device for a vehicle, which may adopt a lens to refract light emitted from a light source to project the light directly on a ground surface, such that clarity of light projected on a ground surface may be greatly improved, particularly, clarity of light projected in a predetermined pattern on the ground surface may be significantly improved, and the lamp device may be installed at a position spaced apart from the ground surface at a predetermined height or more.

An exemplary embodiment of the inventive concepts provides a lamp device for a vehicle, which is mounted on either side of a bumper of a vehicle, the lamp device including a lamp casing installed in the bumper; a guide lamp provided at an upper side inside the lamp casing and configured to project light in a predetermined pattern on a road surface to guide a traveling direction of the vehicle; and an illumination lamp provided at a lower side inside the lamp casing and configured to diffuse the light in a traveling direction of the vehicle to illuminate the traveling direction of the vehicle, in which the guide lamp includes a first light source provided at the upper side inside the lamp casing; and a first lens unit provided in front of the first light source and configured to project the light from the first light source in a predetermined pattern on the road surface in order to guide the traveling direction of the vehicle.

The first lens unit may further include three or more condensing lenses provided in a width direction of the vehicle, and the three or more condensing lenses may project the light from the first light source in three or more patterns on the road surface in order to guide the traveling direction of the vehicle.

The three or more condensing lenses may be provided at different angles based on a ground surface in order to project three or more light beams in predetermined patterns on the road surface.

The three or more condensing lenses may be integrally formed.

The three or more condensing lenses may have the same size.

The first lens unit may be provided in the lamp casing so as to be inclined at a preset angle toward a ground surface.

The preset angle may be 5° to 20° toward the ground surface with respect to a vertical line orthogonal to the ground surface.

The first lens unit may be coupled to the lamp casing so as to be rotatable in a left-right direction of the vehicle.

The first lens unit may be coupled to the lamp casing so as to be rotatable in an up-down direction of the vehicle.

The first lens unit may be coupled to the lamp casing so as to be movable away from or toward the first light source.

The illumination lamp may include a second light source provided at the lower side inside the lamp casing; and a second lens unit provided in front of the second light source and configured to diffuse light from the second light source in the traveling direction of the vehicle in order to illuminate the traveling direction of the vehicle.

The lamp casing may be installed on a surface of the bumper at a height of 400 mm to 500 mm from a ground surface.

Each of the first and second light sources may be configured by an LED lamp.

The LED lamp of the first light source may be brighter than the LED lamp of the second light source.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
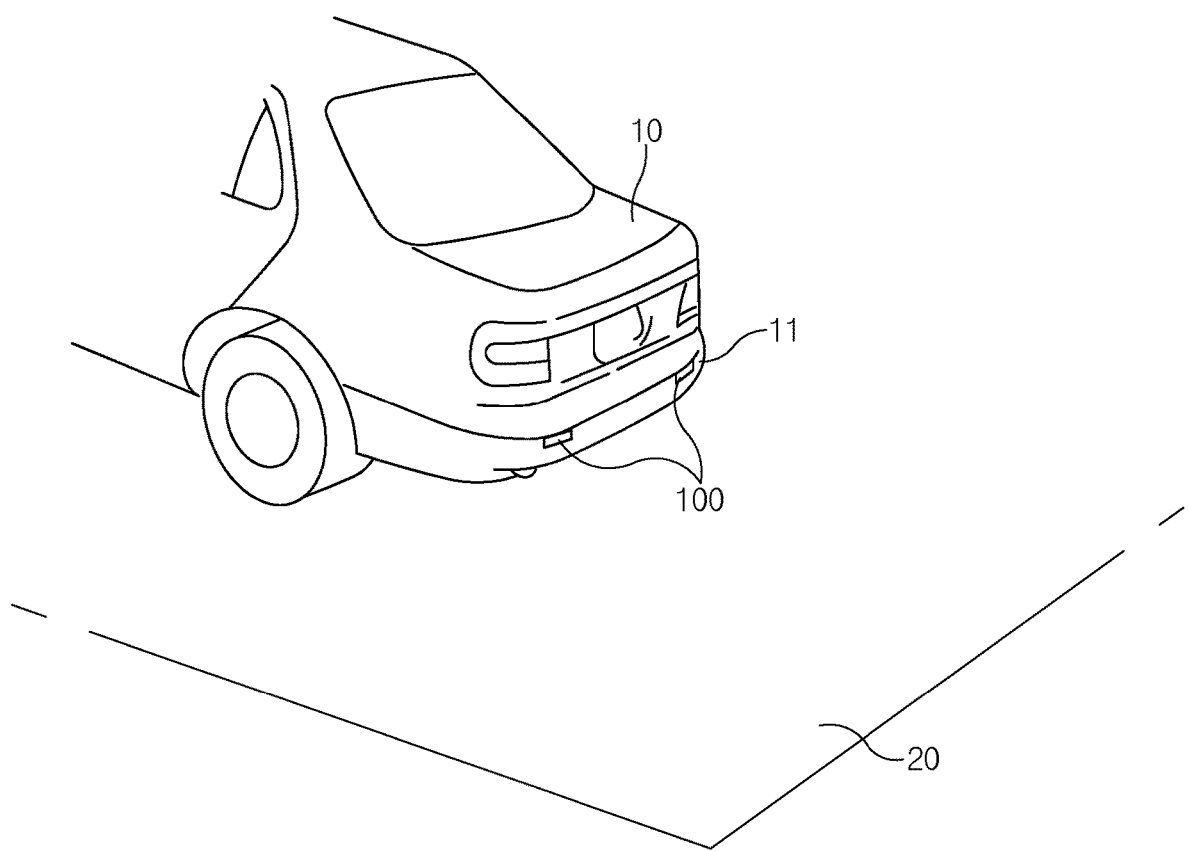
FIG. 1 is a perspective view illustrating lamp devices for a vehicle according to an embodiment of the inventive concepts.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the inventive concepts will be described in detail with reference to the accompanying drawings so that those with ordinary skill in the art to which the inventive concepts pertains may easily carry out the exemplary embodiments. However, the inventive concepts may be implemented in various different ways and is not limited to the exemplary embodiments described herein. A part irrelevant to the description will be omitted in the drawings in order to clearly describe the inventive concepts, and similar constituent elements will be designated by similar reference numerals throughout the specification.

As illustrated in FIGS. 1 to 5, lamp devices 100 for a vehicle according to an embodiment of the inventive concepts are mounted on two sides of a bumper 11 of a vehicle 10, and each of the lamp devices 100 includes a lamp casing 110 installed in the bumper 11, a guide lamp 120 provided at an upper side in the lamp casing 110 and configured to project light in a predetermined pattern on a road surface to guide a traveling direction of the vehicle 10, and an illumination lamp 130 provided at a lower side in the lamp casing 110 and configured to diffuse light toward the road surface in the traveling direction of the vehicle to illuminate the traveling direction of the vehicle 10.

That is, the lamp device 100 for a vehicle according to an embodiment of the inventive concepts is mounted in the bumper provided on a front side of the vehicle or the bumper provided on a rear side of the vehicle so as to project light in a predetermined pattern on the road surface in the traveling direction of the vehicle and to illuminate the road surface in the traveling direction of the vehicle when the vehicle moves forward or rearward, thereby improving safety.

Figure 5:
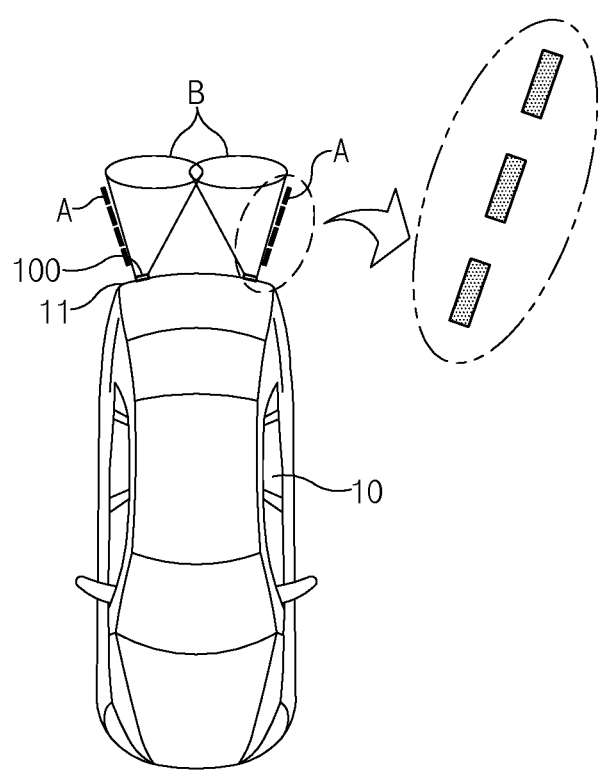
FIG. 5 is a top plan view illustrating a state in which the lamp device for a vehicle according to the first exemplary embodiment of the inventive concepts is used.

In this case, FIGS. 1 and 5 illustrate aspects of embodiments in which the lamp device 100 for a vehicle according to an embodiment of the inventive concepts is mounted in the bumper provided on the rear side of the vehicle, but the lamp device 100 may be mounted in the bumper provided on the front side of the vehicle.

Meanwhile, referring to FIG. 5, the lamp devices 100 for a vehicle according to an embodiment of the inventive concepts use the guide lamps 120 to form clear light projection areas A having predetermined patterns at both sides of the vehicle 10, such that a driver may ascertain the traveling direction of the vehicle and a pedestrian may recognize a dangerous area. In particular, the guide lamp 120 emits light directly onto the ground surface to form the light projection area A, thereby clearly forming the light projection area A on the ground surface even in a shaded area during the day or even in the early evening when it is not dark.

The lamp casing 110 is mounted in the bumper 11 of the vehicle 10 and includes a casing unit 111 mounted in the bumper 11 of the vehicle 10, and a cover unit 112 coupled to a front surface of the casing unit 111 and made of a transparent material.

Meanwhile, the cover unit 112 is coupled to the front surface of the casing unit 111 so as to be inclined at a preset angle "a" toward the ground surface. That is, the cover unit 112 is coupled in a state in which the cover unit 112 is inclined at the angle "a" of about 5° to 20°, particularly, 10° toward a ground surface 20 with respect to a vertical line h orthogonal to the ground surface 20. Therefore, it is possible to prevent light, which is emitted from a light source and refracted by a lens unit, from being blocked by the casing unit 111, and as a result, it is possible to stably project the light, which is emitted from the light source, on the ground surface 20 through the cover unit 112.

The guide lamp 120 serves to form the light projection area having a predetermined pattern on the ground surface and includes a first light source 121 and a first lens unit 122.

The first light source 121 serves to emit light. The first light source 121 is provided at an upper side inside the lamp casing 110 and configured by an LED lamp that emits light by being supplied with power.

The first lens unit 122 serves to refract the light emitted from the first light source to form a light projection area having a predetermined pattern on the ground surface. The first lens unit 122 is provided in front of the first light source 121 (at the right side of the first light source based on FIG. 2) and refracts the light emitted from the first light source 121 to project the light in a predetermined pattern on the road surface, thereby forming the light projection area A configured to guide the traveling direction of the vehicle.

That is, the first lens unit 122 refracts the light emitted from the first light source 121 so that the light is transmitted directly onto the ground surface 20. In particular, the first lens unit 122 may project the light emitted from the first light source 121 to form the light projection area A having a predetermined pattern on the road surface 20, thereby guiding the traveling direction of the vehicle. Therefore, based on the light projection area A, the driver may ascertain the traveling direction of the vehicle, and the pedestrian may recognize a dangerous area. In particular, the first lens unit 122 may project the light, which is emitted from the first light source 121, directly on the road surface, thereby greatly improving clarity which is brightness of the light projection area A.

Meanwhile, the first lens unit 122 may include three or more condensing lenses 122a provided in a width direction of the vehicle. That is, the three or more condensing lenses 122a project the light, which is emitted from the first light source 121, on the road surface to form three or more light projection areas A each having a predetermined pattern, such that the traveling direction of the vehicle may be clearly ascertained. In this case, the condensing lenses may be aspherical lenses.

Meanwhile, the three or more condensing lenses 122a are provided at different angles with respect to the ground surface, thereby forming three or more light projection areas A having predetermined patterns on the road surface 20. For example, the three or more condensing lenses 122a may be provided at different angles, thereby forming three or more light projection areas A having a zigzag pattern on the road surface 20. The three or more light projection areas A may be connected in a direction along a longitudinal direction of the vehicle. The three or more light projection areas A may be connected in a direction along the width direction of the vehicle. The three or more light projection areas A may also be connected in an inclined direction having an angle that gradually increases as a distance from the vehicle increases.

Meanwhile, the three or more condensing lenses 122a may be integrally formed. That is, because angles of the three or more condensing lenses 122a may be changed by vibration and impact occurring while the vehicle 10 travels, the three or more condensing lenses 122a may be integrally formed to increase fixing forces thereof and thus prevent the change in angles due to vibration, impact, and other forces that act upon the lamp device 100.

Meanwhile, the three or more condensing lenses 122a may be detachably coupled in the lamp casing 110, thereby improving ease of installation of the three or more condensing lenses 122a.

Meanwhile, the three or more condensing lenses 122a are positioned closer to the cover unit than is a second lens unit. Therefore, it is possible to prevent the light emitted from the first light source 121 from being blocked by the second lens unit.

Meanwhile, the three or more condensing lenses 122a may be coupled in the lamp casing 110 so as to be slidable in a direction toward the first light source 121 or a direction opposite thereto. As a result, a focal length of light between the first light source 121 and the first lens unit 122 may be adjusted, such that the clarity and the size of the light projection area A projected on the ground surface 20 may be adjusted.

Meanwhile, the three or more condensing lenses 122a may have the same size. Therefore, the light projection areas A projected on the ground surface 20 may be adjusted to have the same length and the same thickness.

Alternatively, the three or more condensing lenses 122a may have different sizes. That is, the sizes of the condensing lenses may be decreased or increased in the order from the condensing lens at one side to the condensing lens at the other side, such that the sizes of the light projection areas A projected on the ground surface 20 may be adjusted to be gradually decreased or increased.

Meanwhile, a barrier wall 122b, which equally divides the condensing lens 122a in a left-right direction, may be formed at a center of the condensing lens 122a when viewed based on the vehicle 10, such that the light projection area A may be formed in an "11" shape.

Meanwhile, the first lens unit 122 may be provided in the lamp casing 110 so as to be inclined at a preset angle θ with respect to the ground surface 20, thereby forming the light projection area A by transmitting the light, which is emitted from the first light source 121, to the ground surface 20 adjacent to the traveling direction of the vehicle 10. With such a configuration, because the guide lamp 120 serves to indicate the direction in which the vehicle 10 moves, particularly, to indicate caution, the guide lamp 120 may form the light projection area A as close to the vehicle 10 as possible.

The preset angle θ may be 5° to 20°, particularly, 10° toward the ground surface 20 with respect to the vertical line h orthogonal to the ground surface 20, thereby forming the light projection area A close to the vehicle 10.

The guide lamp 120 configured as described above may form the plurality of light projection areas A having predetermined patterns in the traveling direction of the vehicle 10, such that particularly, the clarity, which is the brightness of the light projection areas A, may be greatly improved.

The illumination lamp 130 serves to illuminate the traveling direction of the vehicle 10 and includes a second light source 131 and the second lens unit 132.

The second light source 131 is provided at the lower side inside the lamp casing 110 and configured by an LED lamp that emits light by being supplied with power.

The second lens unit 132 is provided in front of the second light source 131 and diffuses the light, which is emitted from the second light source 131, in the traveling direction of the vehicle 10 to form illumination areas B on the ground surface 20. Meanwhile, the illumination areas B are formed on the ground surface 20 between the light projection areas A projected at both sides of the vehicle 10.

In this case, the second lens unit 132 includes three or more diffusion lenses, and the number of lenses may be determined in accordance with a function of the second lens unit 132.

Therefore, as illustrated in FIG. 5, the lamp device 100 for a vehicle according to an embodiment of the inventive concepts may use the guide lamp 120 to form the light projection areas A having predetermined patterns on the ground surface 20 positioned in the traveling direction of the vehicle 10 and form the bright illumination areas B between the light projection areas A. Accordingly, it is possible to prevent an accident from occurring when the vehicle 10 moves forward or rearward.

In particular, when the lamp device 100 for a vehicle according to an embodiment of the inventive concepts is used as a reversing or rear lamp, the lamp device 100 may form a pattern of light on the ground surface that cannot be seen by the driver, thereby greatly preventing the occurrence of a pedestrian accident.

Meanwhile, because the lamp device 100 for a vehicle according to an embodiment of the inventive concepts clearly forms the light projection area A having a predetermined pattern on the ground surface 20, the lamp casing 110 may be installed in a surface of the bumper 11 at a height of 400 mm to 500 mm from the ground surface, such that the lamp device 100 may be applied to vehicles having various sizes.

Meanwhile, in the lamp device 100 for a vehicle according to an embodiment of the inventive concepts, the first light source 121 may use an LED lamp brighter than an LED lamp of the second light source 131. That is, because the light projection area A may be more clearly projected than the illumination area B, the first light source 121 uses an LED lamp brighter than an LED lamp of the second light source 131.

Hereinafter, in the description of another exemplary embodiment of the inventive concepts, like reference numerals are used for constituent elements having the same functions as the constituent elements described in the above-mentioned exemplary embodiment, and repeated descriptions thereof will be omitted.

Figure 2:
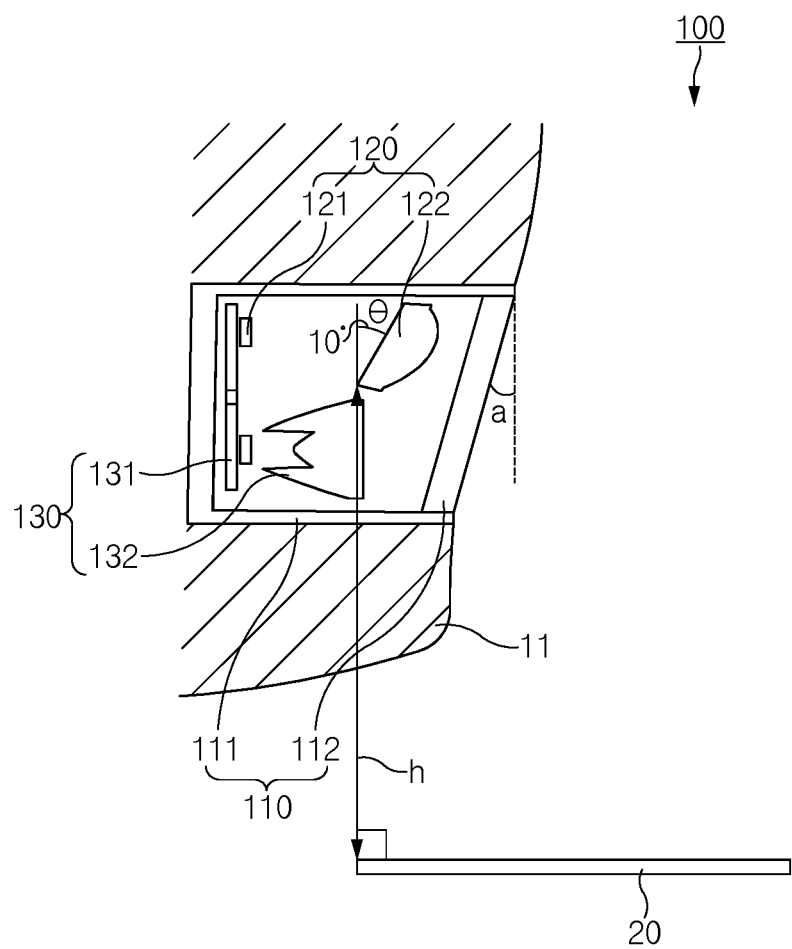
FIG. 2 is a cross-sectional view illustrating the lamp device for a vehicle according to the first exemplary embodiment of the inventive concepts.
Figure 3:
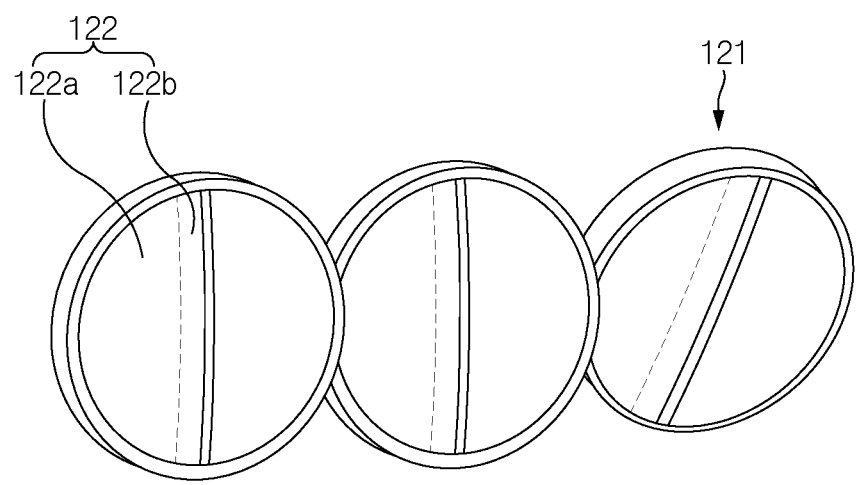
FIG. 3 is a perspective view illustrating a first lens unit of the lamp device for a vehicle according to the first exemplary embodiment of the inventive concepts.
Figure 4:
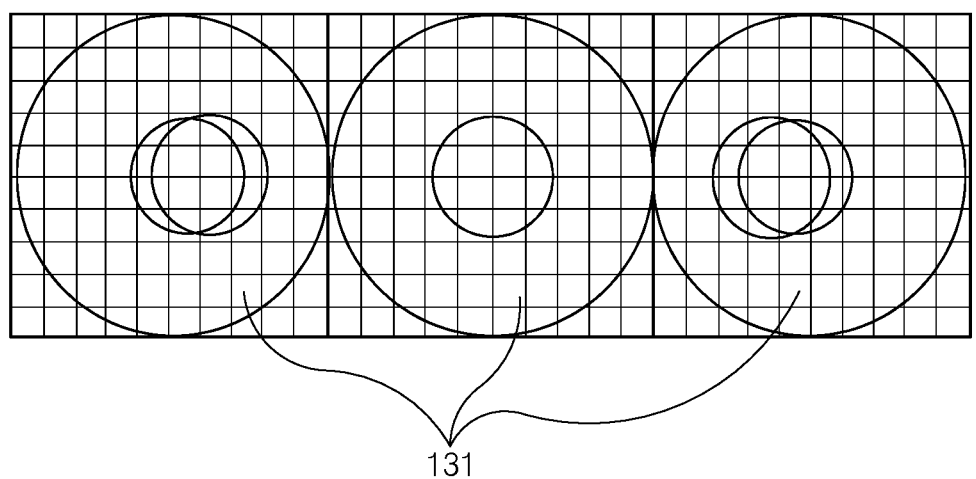
FIG. 4 is a front view illustrating a second lens unit of the lamp device for a vehicle according to the first exemplary embodiment of the inventive concepts.
Figure 6:
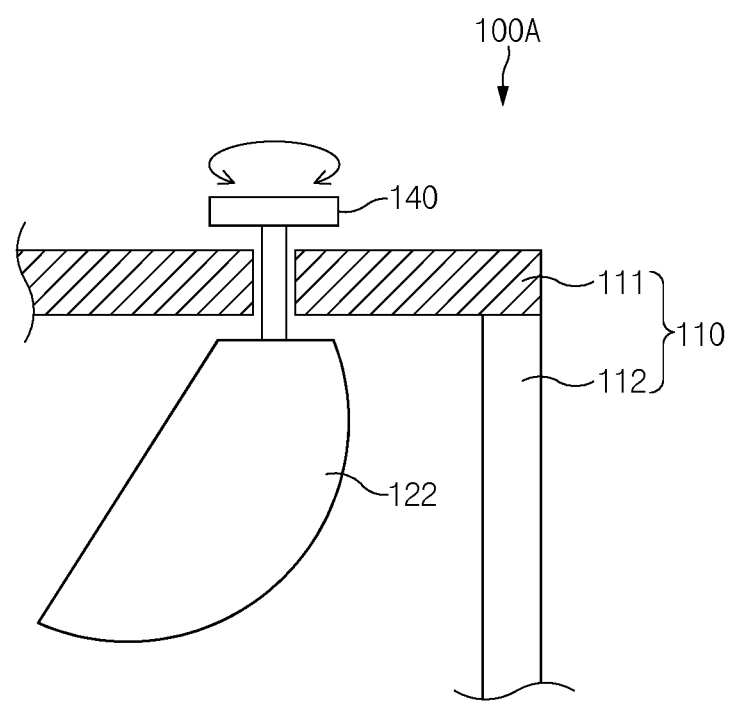
FIG. 6 is a front view illustrating a lamp device for a vehicle according to another embodiment of the inventive concepts.

As illustrated in FIGS. 2 and 6, a lamp device 100A for a vehicle according to another embodiment of the inventive concepts includes the lamp casing 110, the guide lamp 120, and the illumination lamp 130, and the guide lamp 120 includes the first light source 121 and the first lens unit 122.

In this case, the first lens unit 122 is coupled to the lamp casing 110 so as to be rotatable in the left-right direction of the vehicle 10.

That is, the first lens unit 122 includes a left-right adjustment lever 140 formed on an upper side of the first lens unit and extending to the outside of the lamp casing 110. The first lens unit 122 may be rotated leftward or rightward by rotating the left-right adjustment lever 140, such that the light projection area A projected on the ground surface 20 may be moved leftward or rightward Accordingly, the lamp device 100A for a vehicle according to another embodiment of the inventive concepts may adjust a left-right position of the light projection area A projected on the ground surface 20 based on the vehicle 10.

Figure 7:
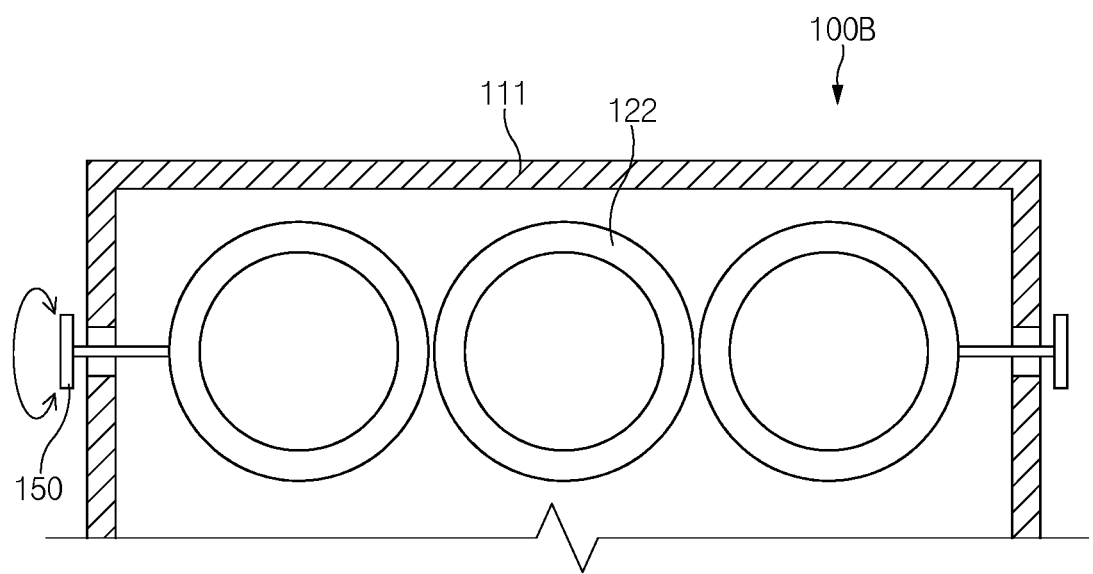
FIG. 7 is a cross-sectional view illustrating a lamp device for a vehicle according to another embodiment of the inventive concepts.

As illustrated in FIGS. 2 and 7, a lamp device 100B for a vehicle according to another embodiment of the inventive concepts includes the lamp casing 110, the guide lamp 120, and the illumination lamp 130, and the guide lamp 120 includes the first light source 121 and the first lens unit 122.

In this case, the first lens unit 122 is coupled to the lamp casing 110 so as to be rotatable in an up-down direction of the vehicle 10.

That is, the first lens unit 122 includes up-down adjustment levers 150 formed on lateral sides of the first lens unit and extending to the outside of the lamp casing 110. The first lens unit 122 may be rotated upward or downward by rotating the up-down adjustment levers 150, such that the light projection area A projected on the ground surface 20 may be moved upward or downward.

Accordingly, the lamp device 100B for a vehicle according to another embodiment of the inventive concepts may adjust an up-down position of the light projection area A projected on the ground surface 20 based on the vehicle 10.

Figure 8:
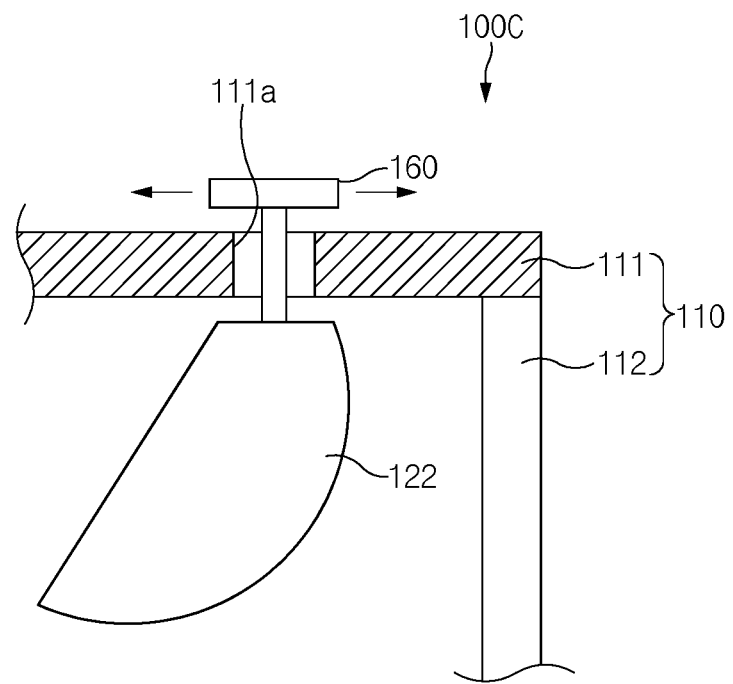
FIG. 8 is a cross-sectional view illustrating a lamp device for a vehicle according to another embodiment of the inventive concepts.

As illustrated in FIG. 8, a lamp device 100C for a vehicle according to another embodiment of the inventive concepts includes the lamp casing 110, the guide lamp 120, and the illumination lamp 130, and the guide lamp 120 includes the first light source 121 and the first lens unit 122.

In this case, the first lens unit 122 is coupled to the lamp casing 110 so as to be movable toward or away from the first light source 121.

That is, the first lens unit 122 includes a front-rear adjustment lever 160 extending to the outside through a long hole 111a formed in an upper surface of the lamp casing 110. As the front-rear adjustment lever 160 is moved forward or rearward in the long hole 111a based on the vehicle 10, the first lens unit 122 may be moved forward or rearward in conjunction with the front-rear adjustment lever 160.

Accordingly, the lamp device 100C for a vehicle according to another embodiment of the inventive concepts may move the light projection area A, which is projected on the ground surface 20, toward or away from the vehicle 10 in a state in which a shape of the light projection area A is maintained.

The lamp device for a vehicle according to the inventive concepts may include the lamp casing, the guide lamp, and the illumination lamp, and the guide lamp may include the first light source and the first lens unit. With the above-described and illustrated features, the light emitted from the first light source may be refracted by the first lens unit, such that the light projection area having a predetermined pattern may be projected on the road surface, thereby greatly improving the clarity which is the brightness of the light projection area projected on the road surface. Further, the improvement of clarity of the light projection area enables the lamp device to be installed at a higher position from the ground surface.

In addition, in the lamp device for a vehicle according to the inventive concepts, the first lens unit may include three or more condensing lenses. With the above-mentioned feature, it is possible to effectively form the light projection areas having three or more patterns on the road surface from the light emitted from the first light source. That is, each of the condensing lenses may form the light projection area on the road surface, thereby greatly improving the clarity of the light projection area and more effectively guiding the traveling direction of the vehicle.

In addition, in the lamp device for a vehicle according to the inventive concepts, the three or more condensing lenses are provided at different angles with respect to the ground surface and form the light projection areas having predetermined patterns on the road surface. With the above-mentioned feature, it is possible to adjust intervals, positions, and ranges of the light projection areas projected on the road surface.

In the lamp device for a vehicle according to the inventive concepts, the three or more condensing lenses may be integrated in the state in which the three or more condensing lenses are provided at different angles. With the above-mentioned feature, it is possible to prevent the angles of the three or more condensing lenses from being changed, and it is possible to project the light in a preset pattern on the road surface.

In the lamp device for a vehicle according to the inventive concepts, the first lens unit is provided to be adjustable in the left-right direction, the up-down direction, or the front-rear direction. With the above-mentioned feature, it is possible to selectively adjust positions of light projected in predetermined patterns on the ground surface.

The scope of the inventive concepts is represented by the claims to be described below rather than the detailed description, and various exemplary embodiments may be derived from the meaning and scope of the claims and the equivalent concepts thereto.

What is claimed is:

1. A lamp device comprising:
a lamp casing disposed in a bumper;
a guide lamp provided at an upper side inside the lamp casing and configured to project light in a predetermined pattern on a road surface to guide a traveling direction of the vehicle; and
an illumination lamp provided at a lower side inside the lamp casing and configured to diffuse the light in a traveling direction of the vehicle to illuminate the traveling direction of the vehicle,
wherein the guide lamp comprises:
a first light source provided at the upper side inside the lamp casing; and
a first lens unit provided in front of the first light source and configured to project the light from the first light source in a predetermined pattern on the road surface in order to guide the traveling direction of the vehicle.

2. The lamp device of claim 1, wherein the first lens unit further comprises three or more condensing lenses provided in a width direction of the vehicle, and the three or more condensing lenses are configured to project the light from the first light source in three or more patterns on the road surface in order to guide the traveling direction of the vehicle.

3. The lamp device of claim 2, wherein the three or more condensing lenses are provided at different angles based on a ground surface in order to project three or more light beams in predetermined patterns on the road surface.

4. The lamp device of claim 2, wherein the three or more condensing lenses are integrally formed.

5. The lamp device of claim 2, wherein each of the three or more condensing lenses has a circular shape with a diameter of a same size.

6. The lamp device of claim 2, wherein the first lens unit is coupled to the lamp casing so as to be rotatable in a left-right direction of the vehicle.

7. The lamp device of claim 1, wherein the first lens unit is provided in the lamp casing so as to be inclined at a preset angle toward a ground surface.

8. The lamp device of claim 7, wherein the preset angle is 5° to 20° toward the ground surface with respect to a vertical line orthogonal to the ground surface.

9. The lamp device of claim 1, wherein the first lens unit is coupled to the lamp casing so as to be rotatable in an up-down direction of the vehicle.

10. The lamp device of claim 1, wherein the first lens unit is coupled to the lamp casing so as to be movable away from or toward the first light source.

11. A lamp device comprising:
a lamp casing configured to be installed in a bumper;
a guide lamp provided at an upper side inside the lamp casing and configured to project light in a predetermined pattern on a road surface to guide a traveling direction of the vehicle; and
an illumination lamp provided at a lower side inside the lamp casing and configured to diffuse the light in a traveling direction of the vehicle to illuminate the traveling direction of the vehicle,
wherein the guide lamp comprises:
a first light source provided at the upper side inside the lamp casing; and
a first lens unit provided in front of the first light source and configured to project the light from the first light source in a predetermined pattern on the road surface in order to guide the traveling direction of the vehicle,
wherein the illumination lamp comprises:
a second light source provided at the lower side inside the lamp casing; and
a second lens unit provided in front of the second light source and configured to diffuse light from the second light source in the traveling direction of the vehicle in order to illuminate a road surface in the traveling direction of the vehicle.

12. The lamp device of claim 11, wherein each of the first and second light sources is configured by an LED lamp.

13. The lamp device of claim 12, wherein the LED lamp of the first light source is brighter than the LED lamp of the second light source.

14. A lamp device comprising:
a lamp casing configured to be installed in a bumper;
a guide lamp provided at an upper side inside the lamp casing and configured to project light in a predetermined pattern on a road surface to guide a traveling direction of the vehicle; and
an illumination lamp provided at a lower side inside the lamp casing and configured to diffuse the light in a traveling direction of the vehicle to illuminate the traveling direction of the vehicle,
wherein the guide lamp comprises:
a first light source provided at the upper side inside the lamp casing; and
a first lens provided in front of the first light source and configured to project the light from the first light source in a predetermined pattern on the road surface in order to guide the traveling direction of the vehicle,
wherein the lamp casing is installed in a surface of the bumper.

* * * * *